United States Patent [19]
Rapp
[11] Patent Number: 4,538,351
[45] Date of Patent: Sep. 3, 1985

[54] CONTACT INSERTION HEAD AND METHOD OF INSERTING CONTACTS

[75] Inventor: Willard E. Rapp, Franklin Township, Somerset County, N.J.

[73] Assignee: AT&T Technologies, Inc., New York, N.Y.

[21] Appl. No.: 535,972

[22] Filed: Sep. 26, 1983

[51] Int. Cl.[3] ........................ H01R 9/24; B23P 19/04

[52] U.S. Cl. ........................................ 29/845; 29/739; 339/176 M

[58] Field of Search ................. 29/739, 842, 844, 845, 29/747; 339/176 M, 176 MP

[56] References Cited

U.S. PATENT DOCUMENTS

| | | | |
|---|---|---|---|
| 3,389,370 | 6/1968 | Davis | 339/176 M X |
| 3,605,237 | 9/1971 | Bakermans . | |
| 3,820,218 | 6/1974 | Serrano . | |
| 4,045,868 | 9/1977 | Ammon et al. | 29/845 |
| 4,077,694 | 3/1978 | Cobaugh et al. . | |
| 4,089,104 | 5/1978 | Barry et al. . | |
| 4,109,993 | 8/1978 | Bauerle | 339/176 M |
| 4,356,626 | 11/1982 | Waghorn . | |

*Primary Examiner*—Howard N. Goldberg
*Assistant Examiner*—Carl J. Arbes
*Attorney, Agent, or Firm*—D. J. Kirk

[57] ABSTRACT

An insertion head (80) for inserting a contact (30) having opposed tines (34—34) into a connector cavity (28) having opposed ribs (49—49) protruding from the inner wall thereof. The insertion head (80) severs a contact (30) from a spine (44) of contact strip (42) and the contact (30) is then moved laterally, away from the strip, to a vertically aligned position above the cavity (28). A punch (128) pushes the contact (30) into the cavity (28) while simultaneously spreading the tines (34—34) apart to straddle the opposed ribs (49—49).

6 Claims, 22 Drawing Figures

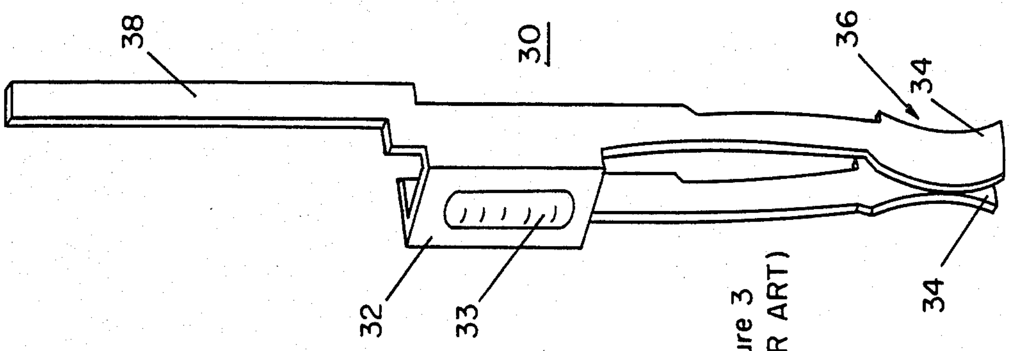
Figure 3
(PRIOR ART)
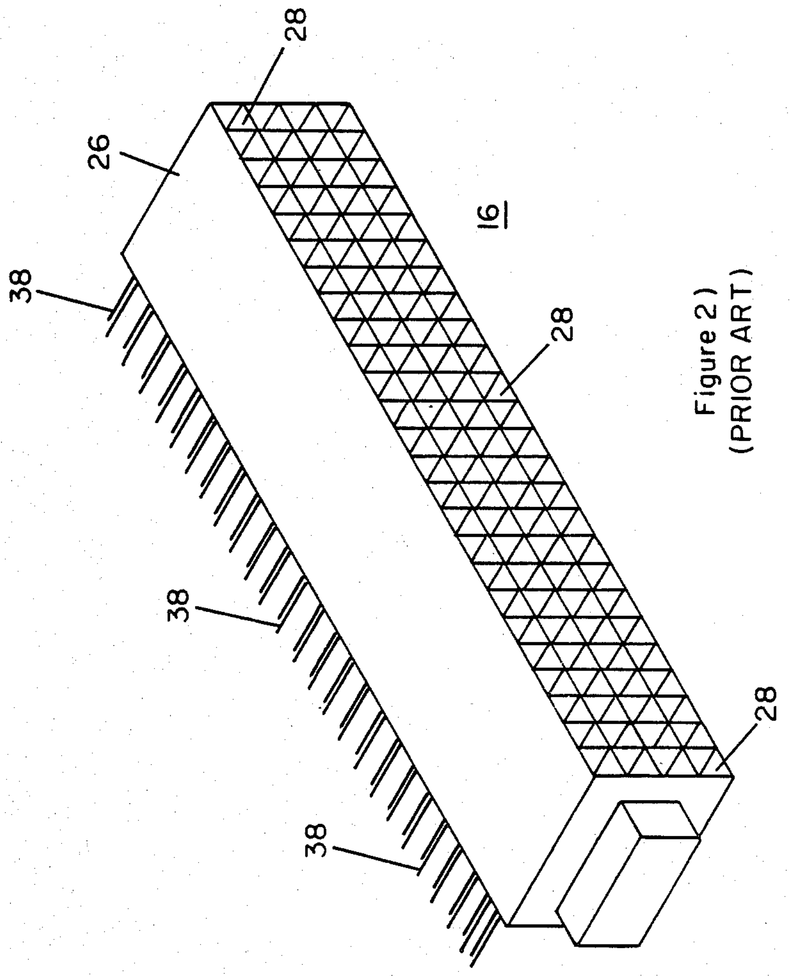
Figure 2)
(PRIOR ART)

CONTACT INSERTION HEAD AND METHOD OF INSERTING CONTACTS

TECHNICAL FIELD

The instant invention is related to the insertion of contacts into connector housings.

BACKGROUND OF THE INVENTION

It is well known to connect printed wiring boards (PWB's) to a backplane having a multitude of contact pins projecting therefrom. This is typically accomplished using a connector comprised of a molded insulator housing having a plurality of cavities therein, each cavity having a metal contact inserted therein. The connector is affixed to the PWB by staking or other fastening means and portions of the contacts projecting from the connector are soldered to the board. The PWB is urged towards the backplane to insert a plurality of contact pins into the appropriate contacts of the connector.

One type of contact used has a central body portion with a pair of tines depending therefrom. The tines have opposed curved ends which are spring biased towards one another. However, to facilitate the insertion of a backplane contact pin therein it is necessary to spread the tines apart slightly prior to insertion. This is accomplished by a pair of opposed elongated ribs molded on the sidewalls of each contact cavity in the connector. As the contact is urged into the connector cavity the opposed tines will straddle the ribs providing the desired tine separation.

Unfortunately, it has been found most difficult to accurately insert the contact into the cavity so as to consistently spread the tines apart. Often both tines will be wedged together on one side of the ribs which prohibits the insertion of any pin therein. Therefore, the contact must be manually removed and a new contact inserted properly therein. Such a replacement operation is time consuming and expensive.

SUMMARY OF THE INVENTION

The foregoing problem has been solved by the instant method of inserting electrical contacts having a body portion and a pair of opposed tines depending therefrom into a connector cavity having opposed ribs therein. The method comprises the steps of: aligning the contact with the connector cavity; and urging a punch into the body portion of the contact to move the contact into the cavity while spreading the tines apart prior to straddling the opposed ribs.

Advantageously, such a technique has substantially eliminated the improper insertion of contacts into connector housings.

BRIEF DESCRIPTION OF THE DRAWINGS

FIG. 2 is an isometric view of a molded insulator connector housing;

FIG. 3 is an isometric view of a contact;

DETAILED DESCRIPTION

Figure 1:
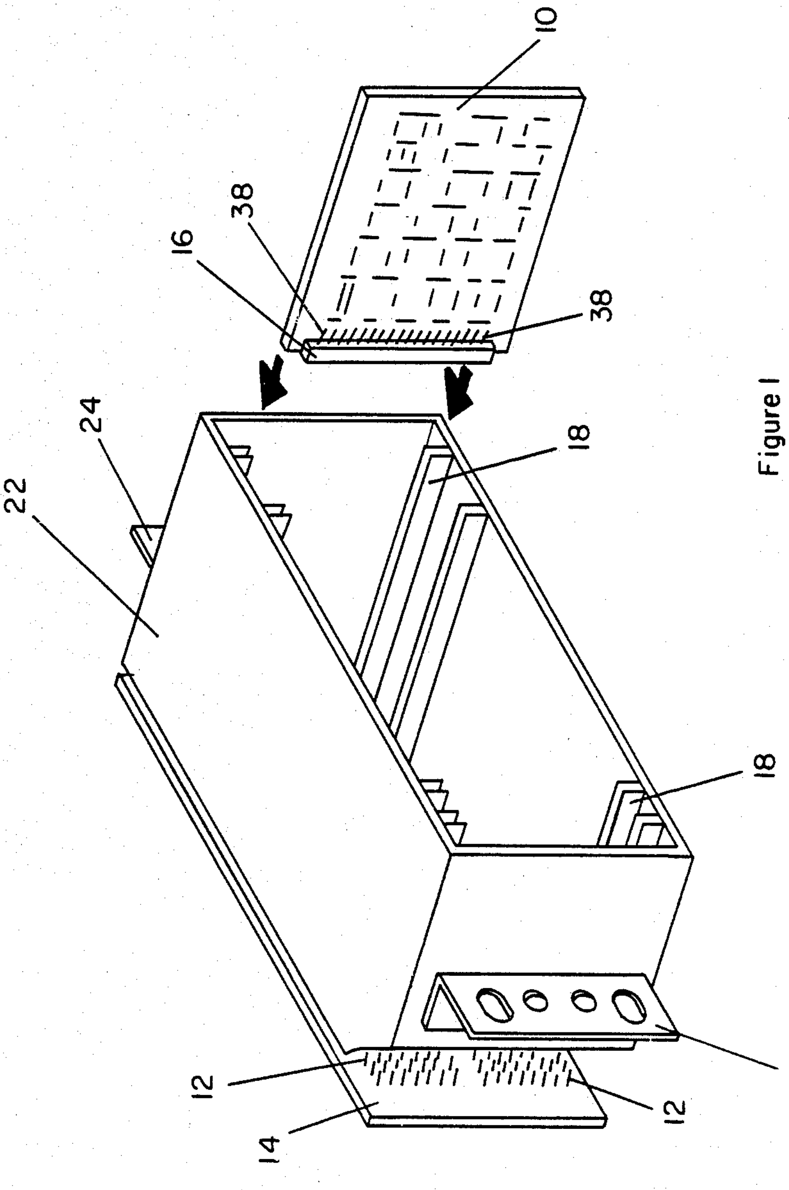
Figure 1 (PRIOR ART)
FIG. 1 is an isometric view of a PWB shelf assembly.

FIG. 1 depicts a typical arrangement for electrically connecting a PWB 10 to a multitude of electrically conductive contact pins 12—12 on a backplane 14. The PWB 10 having a connector 16 affixed to one edge is urged along a pair of opposed rails 18—18 located inside a mounting shelf 22 which is affixed to a frame support (not shown) using brackets 24—24. Once fully inserted into the shelf 22 the pins 12 are slideably captured in contacts (not shown) in the connector 16.

Figure 4:
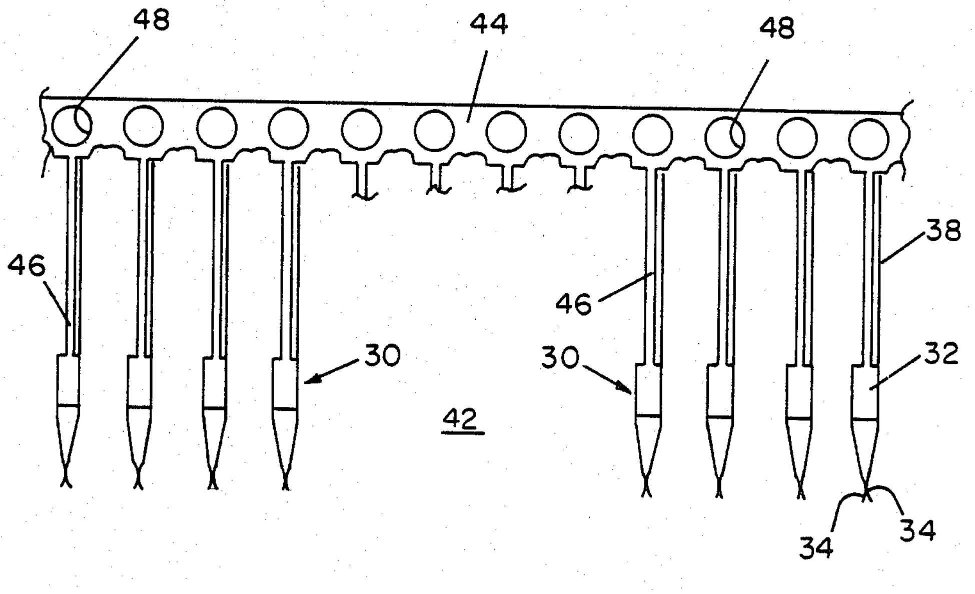
Figure 4 (PRIOR ART)
FIG. 4 depicts a strip of contacts.

Although there are many variations as to the size and the number of contacts, such connectors 16 have the same basic structure (see FIG. 2) comprised of a molded insulator housing 26 having a matrix of square cavities 28—28 on approximately 0.125 inch centers. A metal contact 30, as shown in FIG. 3 (not to scale), is press fit into each of the apertures 28—28. The contact 30 has a "U" shaped central body portion 32 having a protrusion 33 and a pair of opposed, curved, tines 34—34 depending from one end thereof to form a spreadable "duckbill" 36 into which contact pins 12—12 from the backplane 14 (see FIG. 1) are slideably captured. An electrically conductive tail 38 extends from the other end of the body portion 32 and projects from the connector housing 26 when the contact 30 has been properly inserted therein (see FIG. 2). Contacts 30 normally are purchased by the reel wherein a strip 42 of contacts 32 (see FIG. 4) are connected to a spine 44 by support members 46—46. The spine 44 has a plurality of uniformly spaced openings 48—48 therein.

Figure 5:
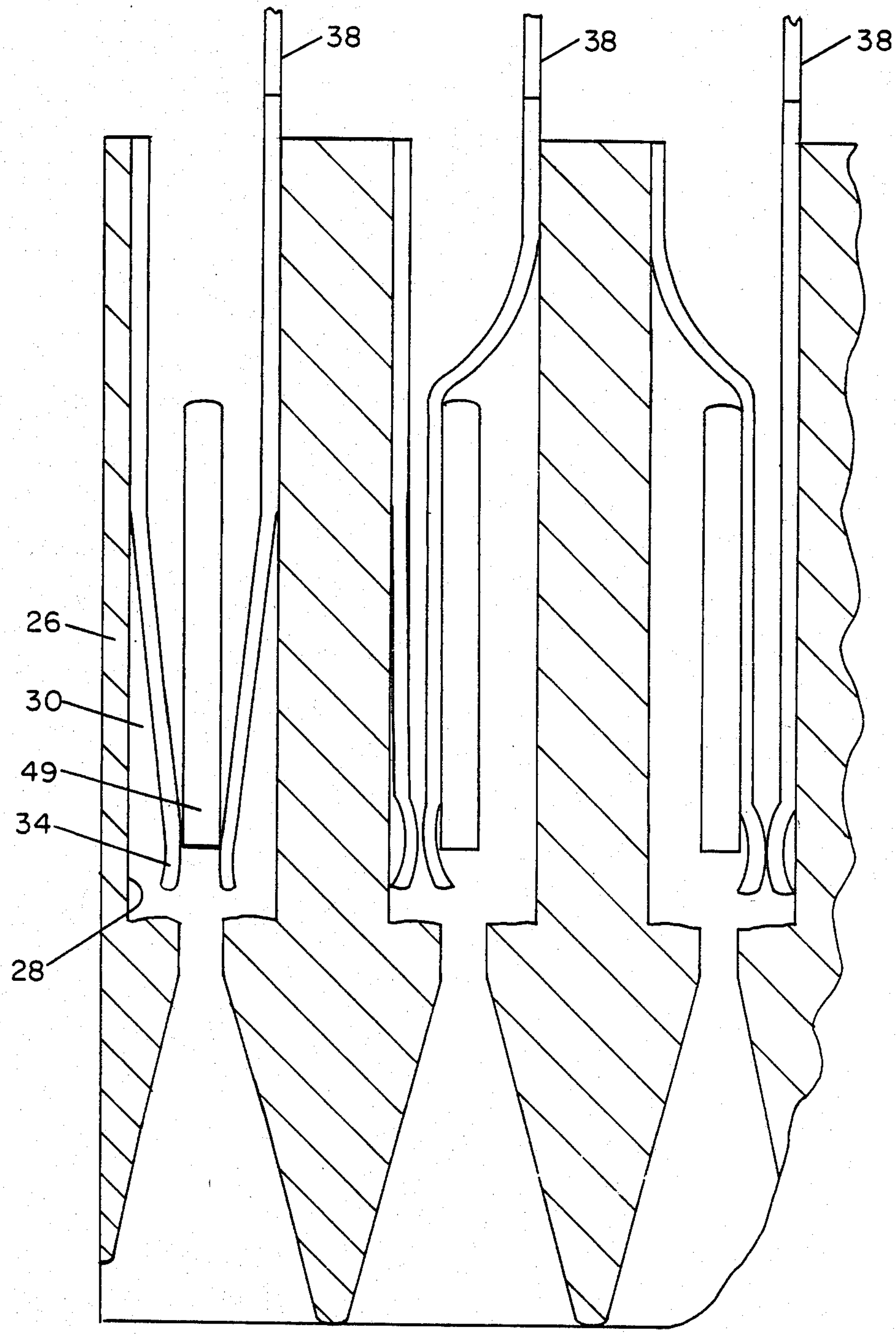
FIG. 5 is a cross-sectional view of a connector with contacts inserted therein.

FIG. 5 is a partial cross-sectional view of a connector 16 having contacts 30—30 inserted in the cavities 28—28 thereof. A properly inserted contact 30 (left side of FIG. 5) with the tines 34—34 straddling and being held apart by a rib 49. Shown in the center and right of the figure are improperly inserted contacts 30—30. Such improperly inserted contacts 30—30 must be removed manually and reinserted. The defect can be observed visually by holding the connector 16 near a light source and looking into the cavities 28—28. Some light passes through the cavity 28 when the contact 30 is properly positioned while no light passes through the cavity when the contact 30 is improperly positioned as hereinbefore indicated, the replacement of such improperly inserted contacts is both time consuming and expensive.

Figure 6:
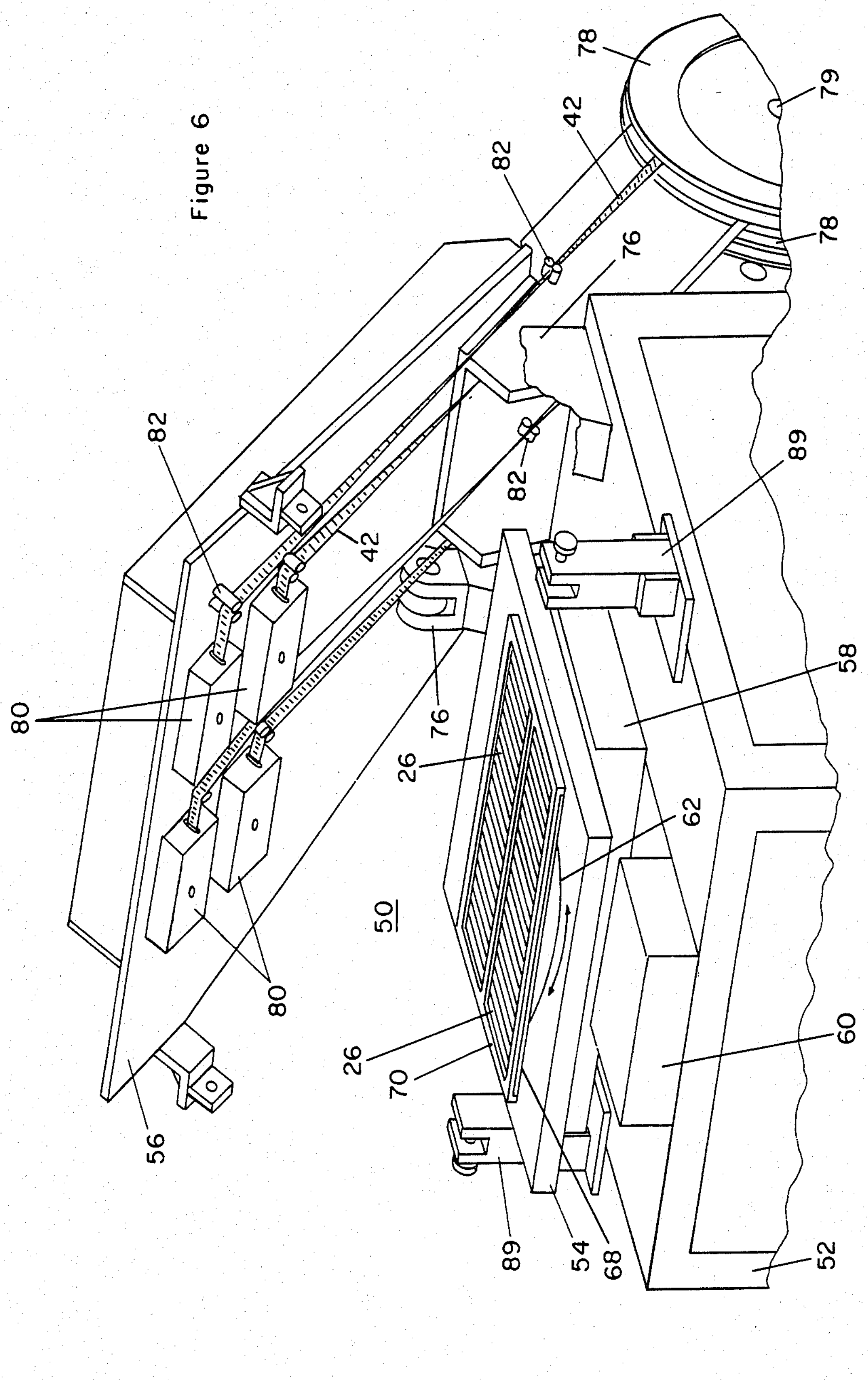
FIGS. 6 and 7 are isometric views of a contact insertion machine.
Figure 7:
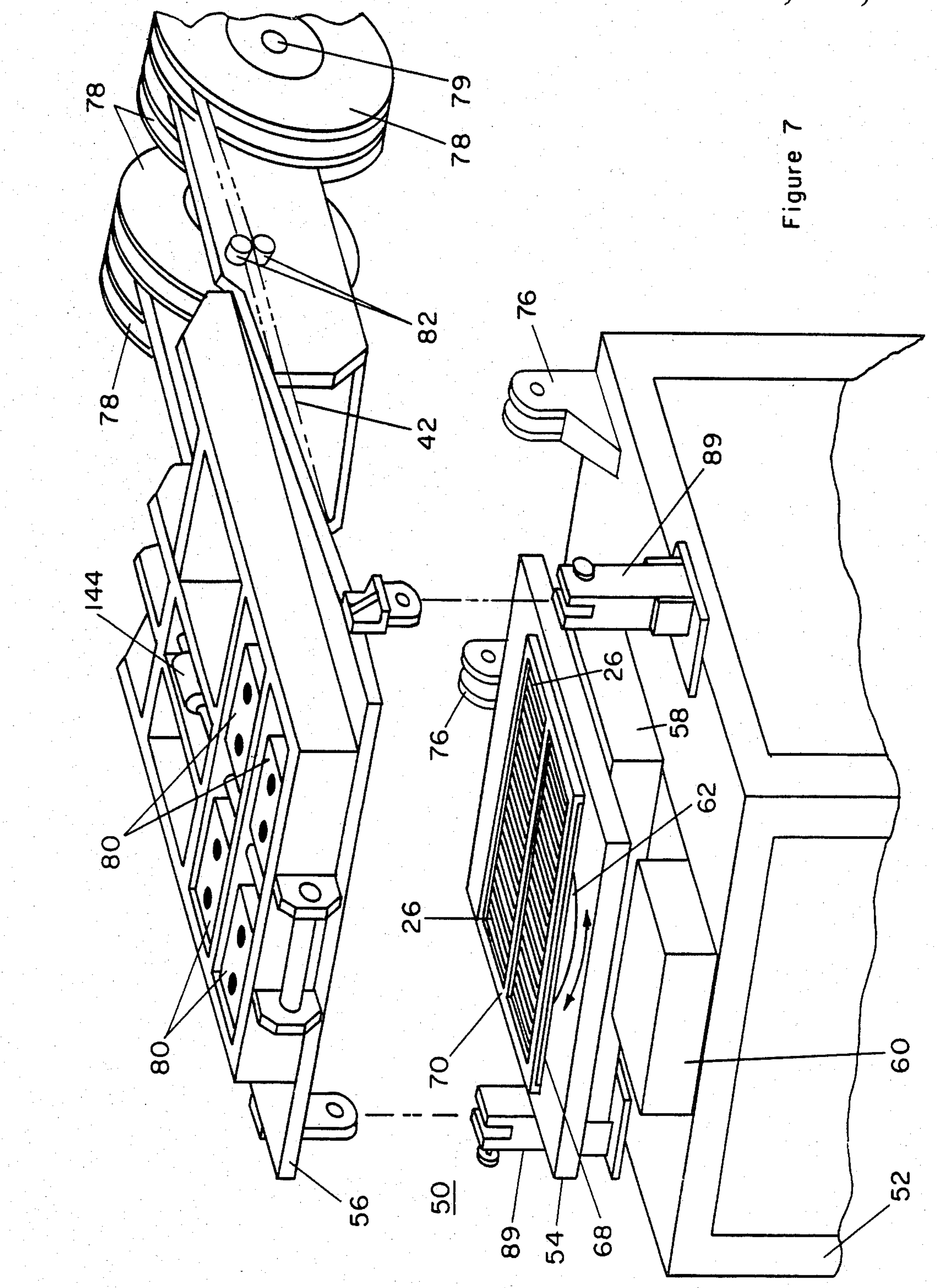

FIGS. 6 and 7 are isometric overall and exploded views, respectively, of a contact insertion machine 50. The machine 50 is also described in copending patent application Ser. No. 535,465, titled "A High Speed Contact Insertion Facility" filed on even date herewith and assigned to the instant assignee, and is hereby incorporated by reference herein. The machine 50 is comprised of a base 52, an X, Y, $\theta$ table 54 and a pivotably mounted superstructure 56.

The X, Y, $\theta$ table 54 has an X movement mechanism 58 and a Y movement mechanism 60 to control the movement of the table 54 in a well known manner under computer control. Additionally, a substantially circular rotatable plate 62 is positioned in the central portion of the table 54 and is rotatable through 180° via control apparatus (not shown). A tray 65 containing a plurality of connector housings 26—26 is fixedly mounted on the circular plate 62 as described in detail in the above-referred to application. The connector housings 26—26 are securely held in the tray 65 by a frame 70.

The superstructure 56 is pivotably mounted at hinges 76—76. Four reels 78—78 of contact strips 42—42 are rotatably mounted on a shaft 79 at one end of the superstructure 56. The strips 42—42 are individually guided into each of a plurality of contact insertion heads 80—80 (shown schematically in FIG. 7) using a plurality of pinwheels 82—82. Scrap residue passing from the heads 80—80 may be directed through guide channels (not shown) to an appropriate receptacle. A locking mechanism 89 is fixedly mounted on the base 52 to lock the superstructure 56 in place during operation.

Figure 8:
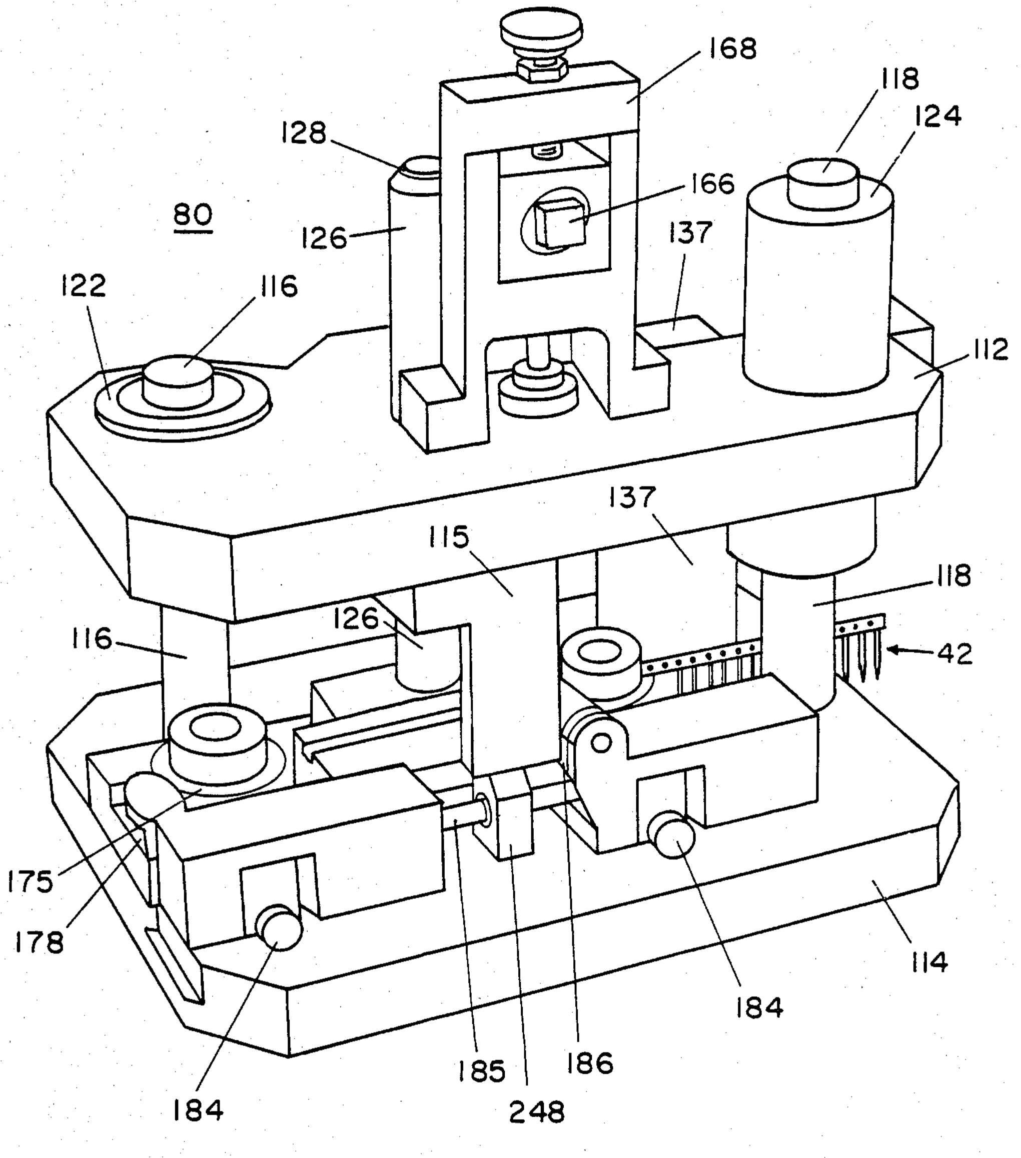
FIGS. 8 and 9 are isometric and side views, respectively, of the instant contact insertion head.
Figure 9:
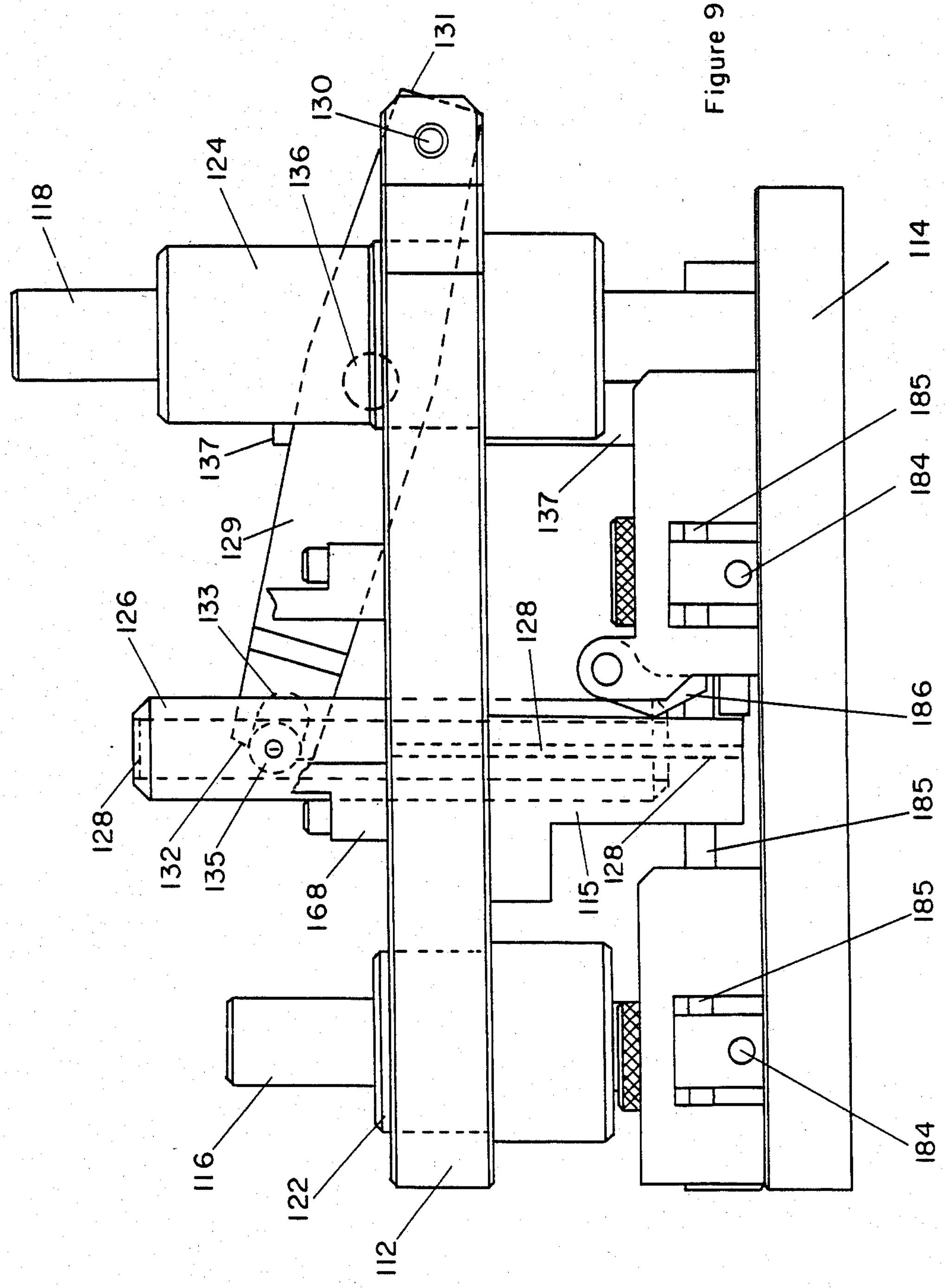
Figure 10:
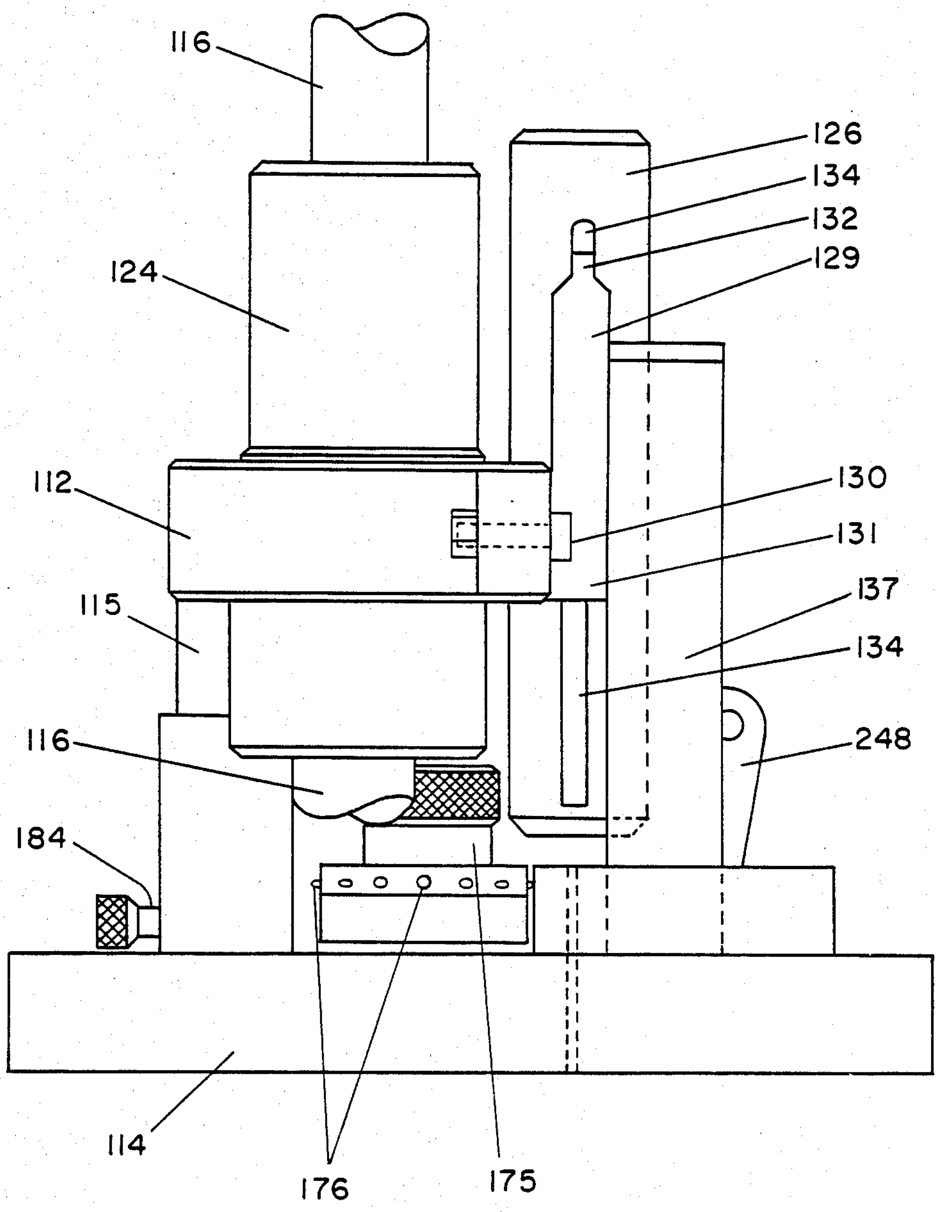
FIG. 10 is an end view of the contact insertion head.

Each insertion head 80 (see FIGS. 8 and 9) has upper and lower plates 112 and 114, respectively. The upper plate 112 is movably mounted on first and second shafts 116 and 118, respectively, using linear bearings 122 and 124, respectively. The shafts 116 and 118 are fixedly mounted on the bottom plate 114 and a cam 115 is fastened to the underside of the top plate 112. A cylindrical punch housing 126 is fixedly mounted on, and extends through, the upper plate 112. A punch 128 is slideably mounted within the housing 126. A lever arm 129 is pivotably connected to the upper plate 112 by a pivot pin 130 at a first end 131. The second end 132 of the arm 129 has an indentation 133 (see FIG. 8) therein which extends into the punch housing 126 through a longitudinal slot 134 (see FIG. 10) to capture a pin 135 (see FIG. 8) located within an opening in the punch 128. A shaft 136 extending from a support means 137, which is fixedly mounted to the lower plate 114, passes through the arm 129 at a location intermediate to the first and second ends 131 and 132, respectively.

Figure 11:
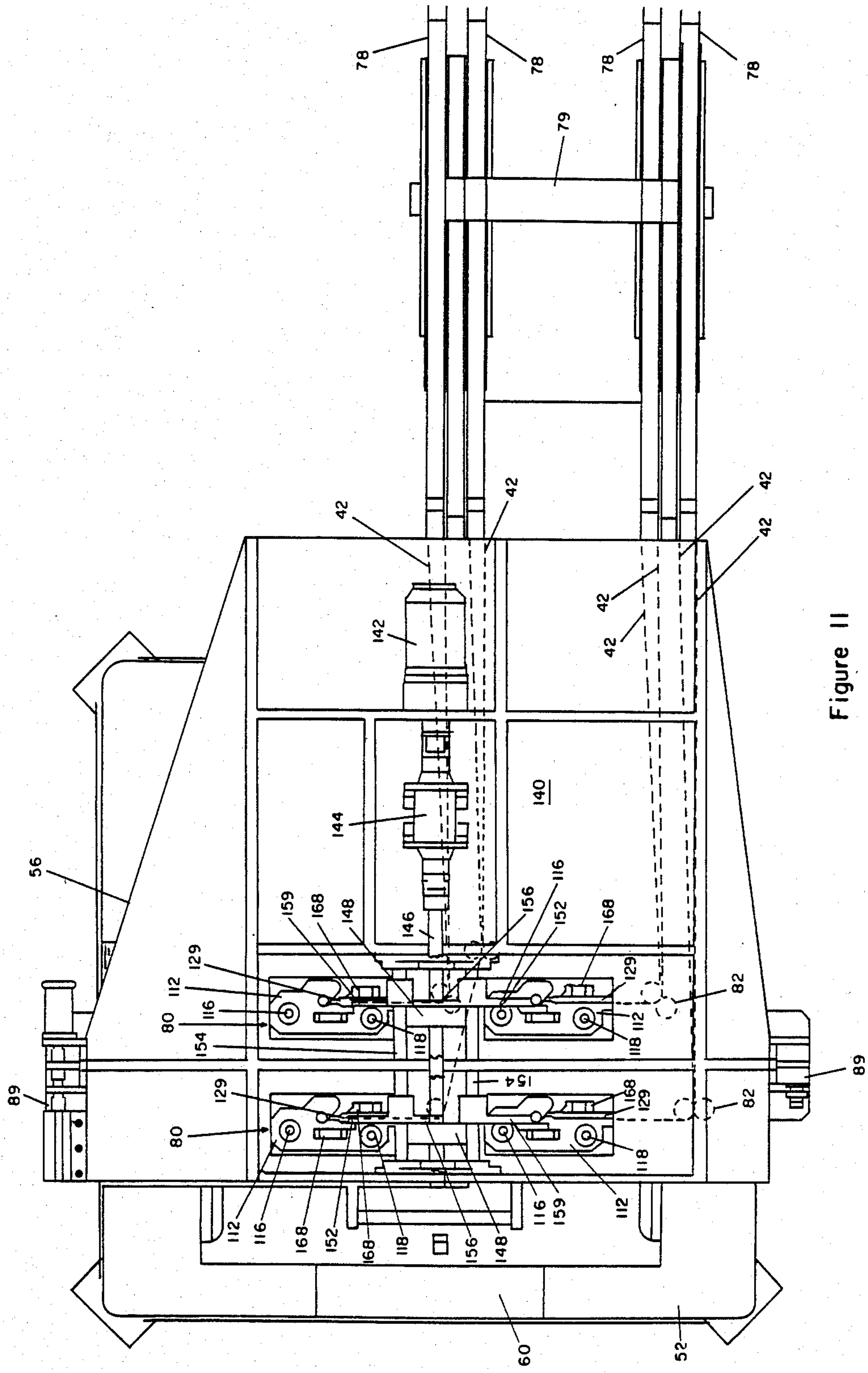
FIG. 11 is a plan view of the insertion head drive mechanism.
Figure 12:
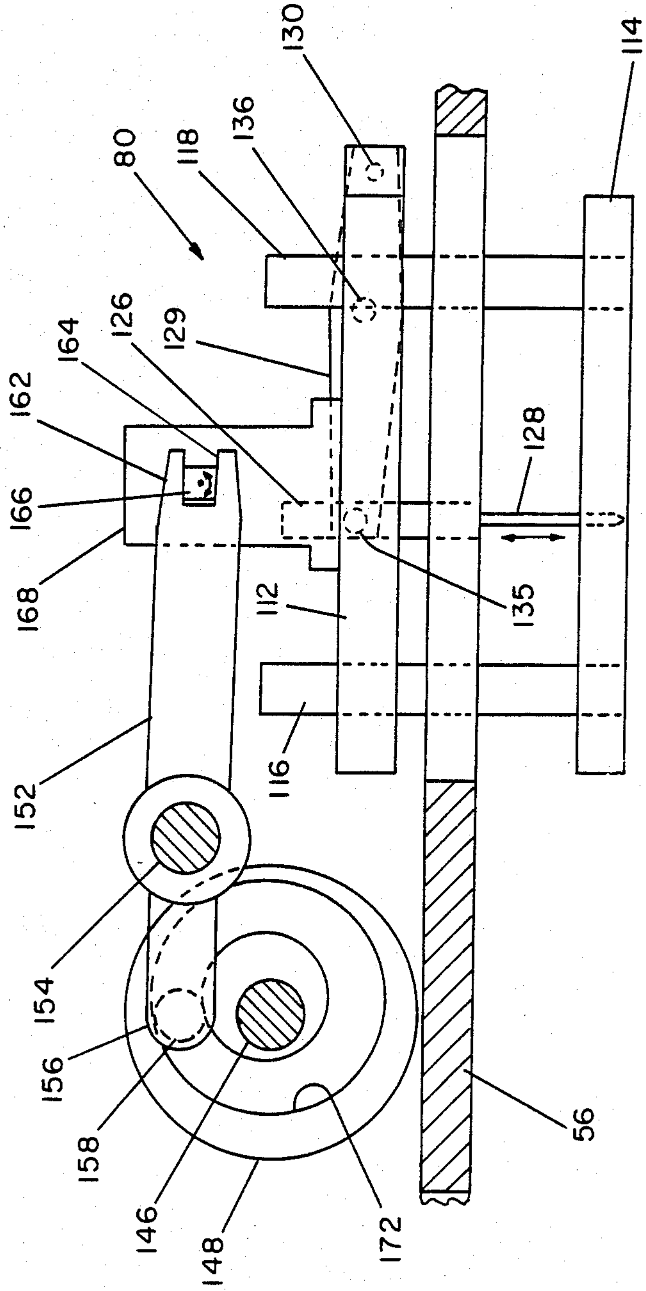
FIG. 12 is a schematic representation of the insertion head drive mechanism.

The movement of the upper plate 112 along the shafts 116 and 118 is accomplished by a drive system 140 located on the superstructure 56 and which can best be seen in the top view of FIG. 11 and the partial cross-sectional schematic view of FIG. 12. The drive system 140 is comprised of D.C. motor 142 connected to a power source (not shown), a clutch-brake 144, a rotatable drive shaft 146 having first and second cylindrical cams 148—148 mounted thereon, a first pair of rocker arms 152—152 each mounted on shafts 154—154. A second pair of rocker arms 159—159 is also connected to, and driven by, the shafts 154—154. A first end 156 of each rocker arm 152 has a cam follower 158 communicating with the cylindrical cam 148 as shown schematically in FIG. 12. The second ends 162 of the rocker arms 152 and ends of rocker arms 159—159 have slots 164—164 which engage a pivotable member 166 mounted in a height adjusting bracket 168 fastened to the upper plate 112.

In operation (see FIG. 11), the D.C. motor 142 is activated to rotate the drive shaft 146 via the clutch-brake 144. The clutch-brake 144 permits the rotation of the drive shaft 146 to be started and stopped to suit the contact insertion sequence. While the D.C. motor 142, coupled to the clutch-brake 144, will run continuously, the insertion head 80 must be stopped when no contacts 30—30 are required to be inserted at predetermined locations. This may occur in the mid-portion of the molded insulator housings 26—26 and when moving from one insulator housing to another.

FIG. 12 schematically depicts the operation of one insertion head 80 of the drive system 140. As the drive shaft 146 rotates the cam 148, the cam follower 158 moves along a track 172 therein causing the second end 162 of the rocker arm 152 to transfer an up and down motion to the upper plate 112 via the height adjusting bracket 168. The upward movement of the upper plate 112 causes the lever arm 129 to pivot about the shaft 136 causing the punch 128 to be moved down, through the lower plate 114. As the upper plate 112 moves down the punch 128 will move up.

Figure 13:
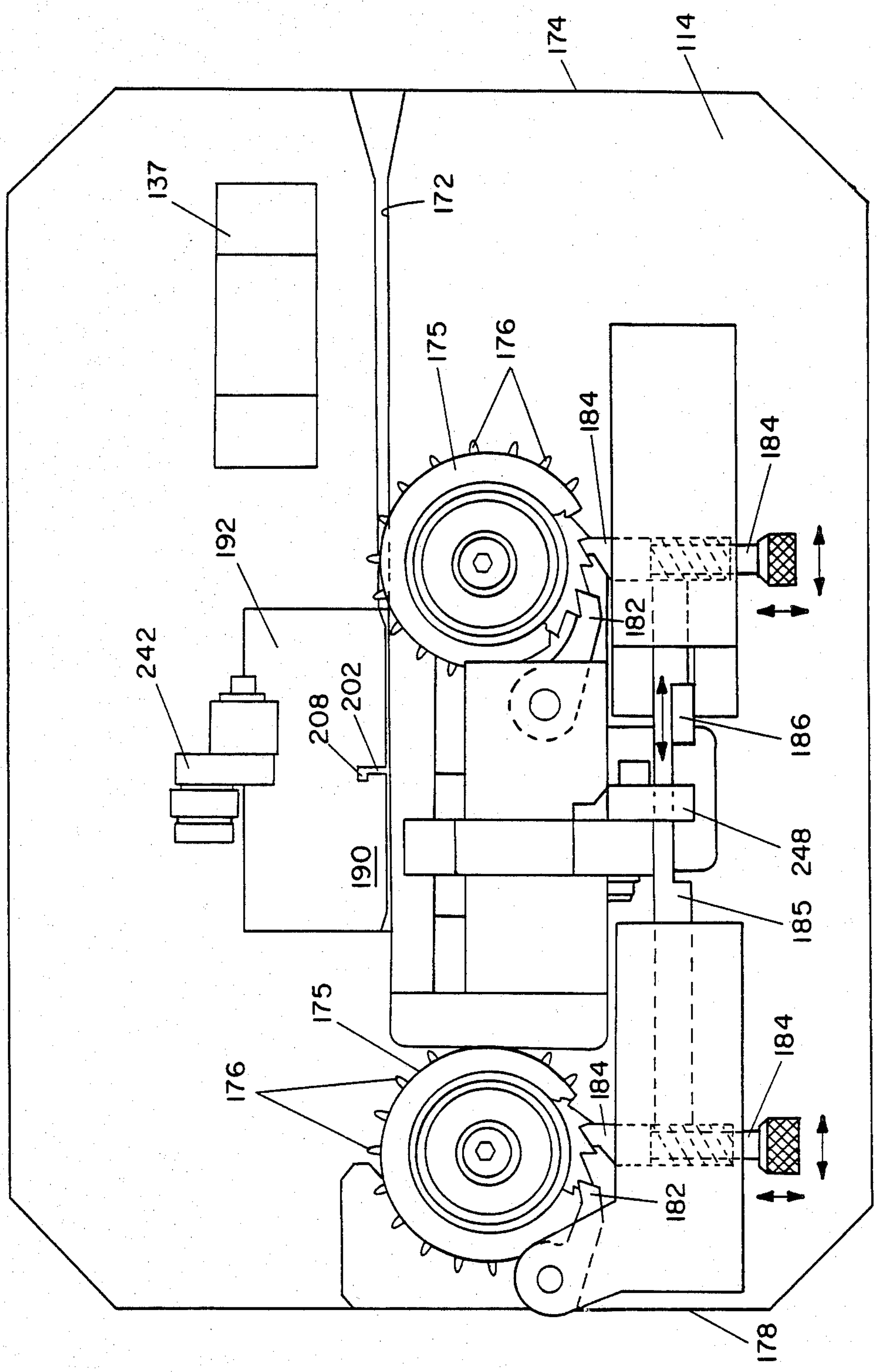
FIG. 13 is a plan view of the lower plate of the insertion head.
Figure 14:
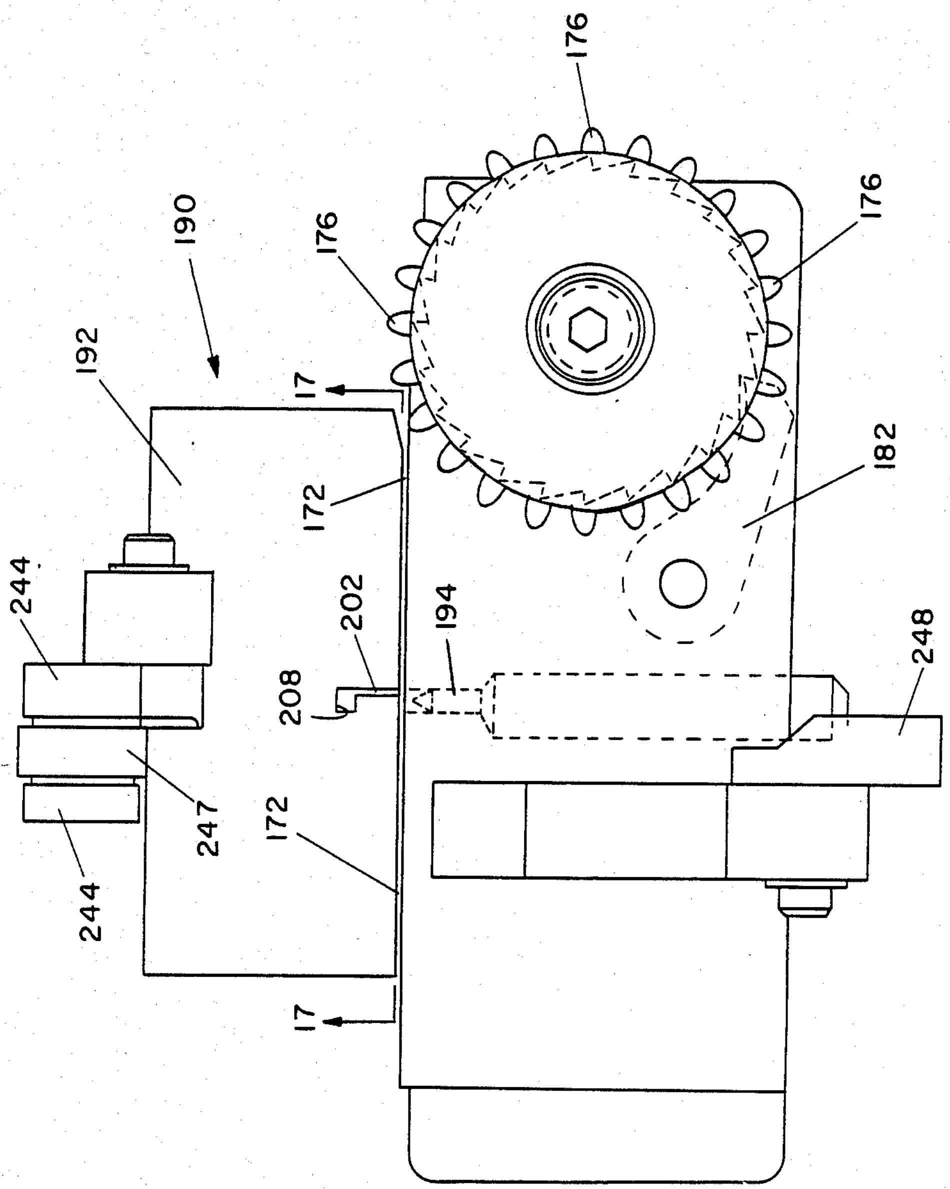
FIG. 14 is a plan view of the cut and transfer station.
Figure 15:
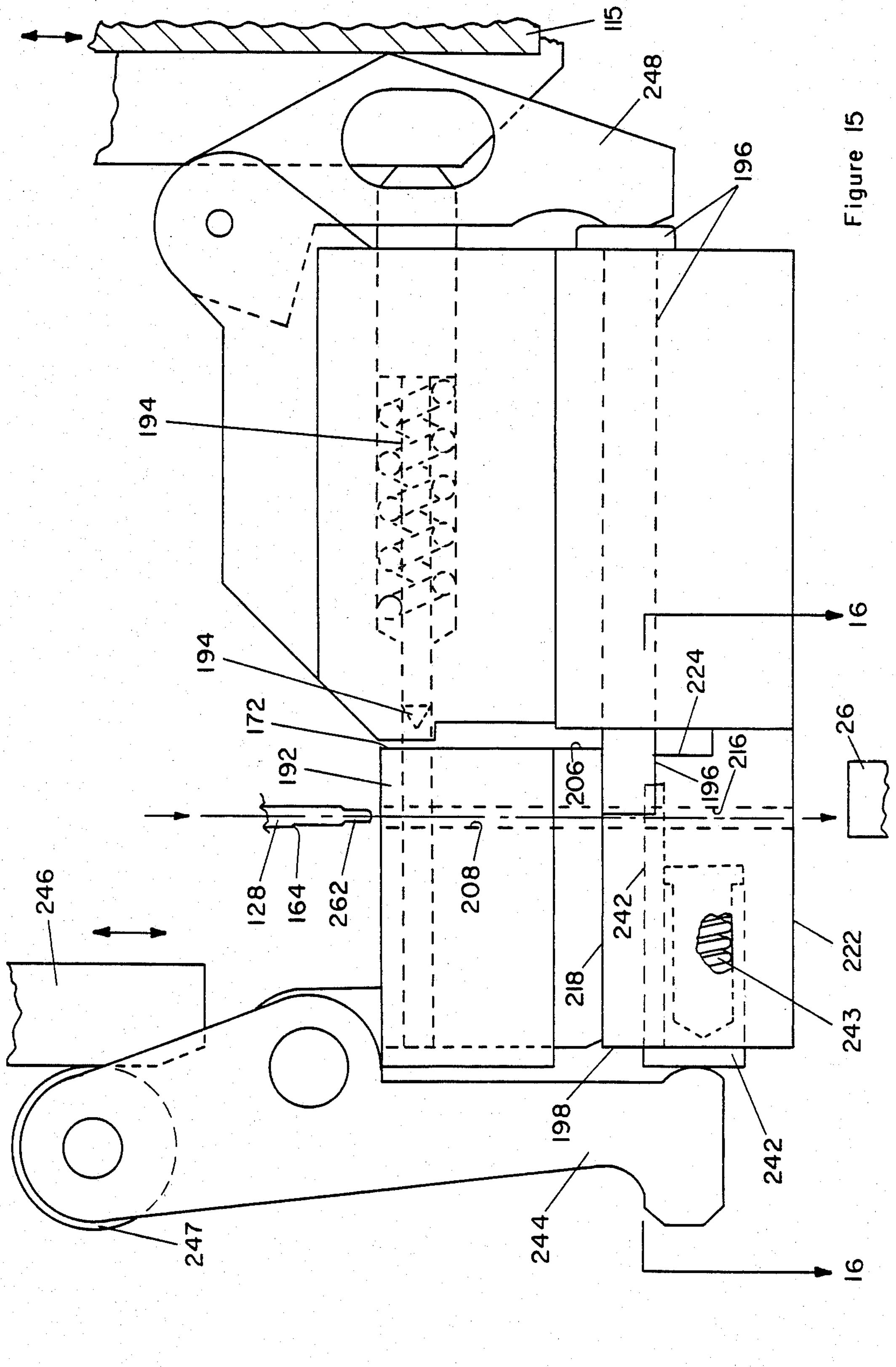
FIGS. 15 to 17 are partial cross-sectional views of the cut and transfer station.
Figure 16:
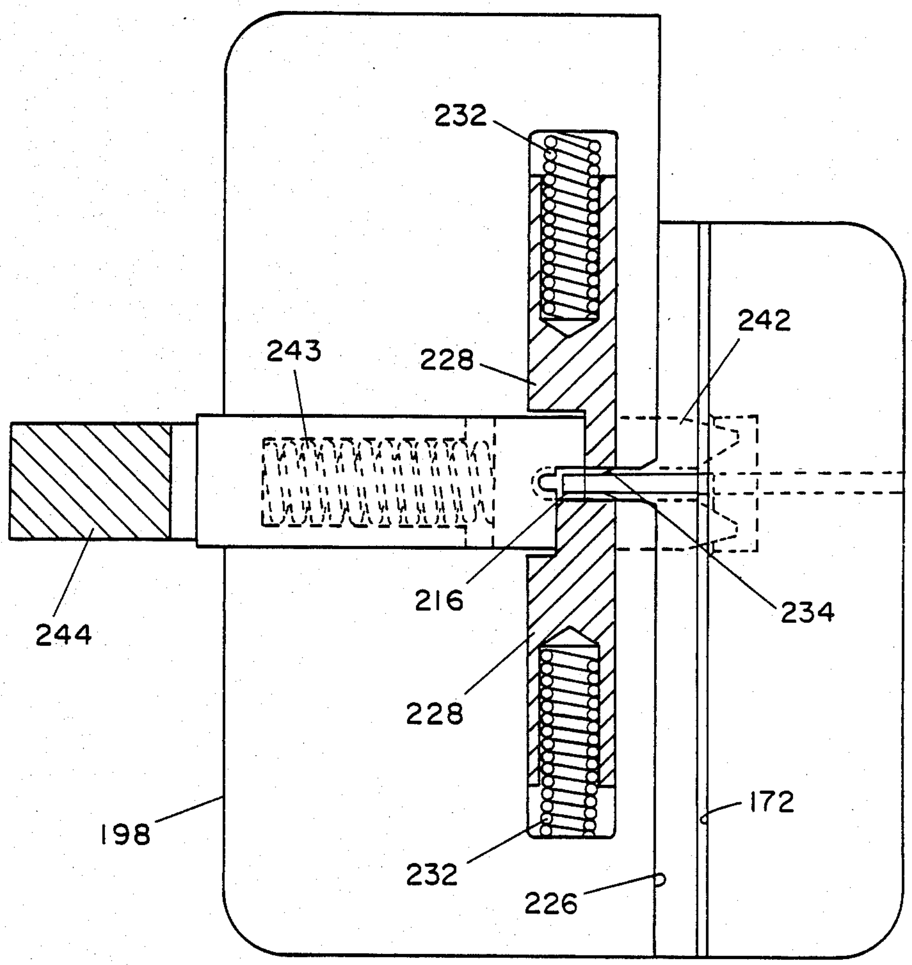
Figure 17:
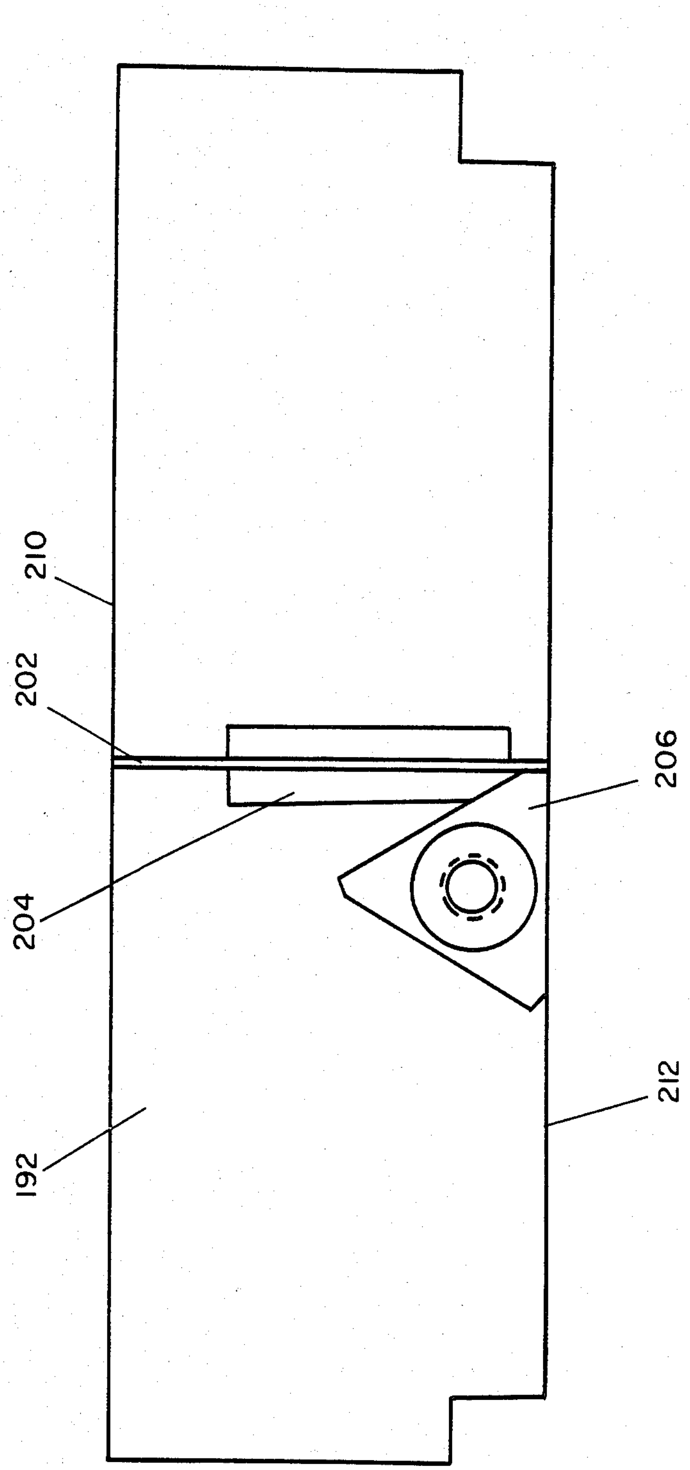
Figure 18:
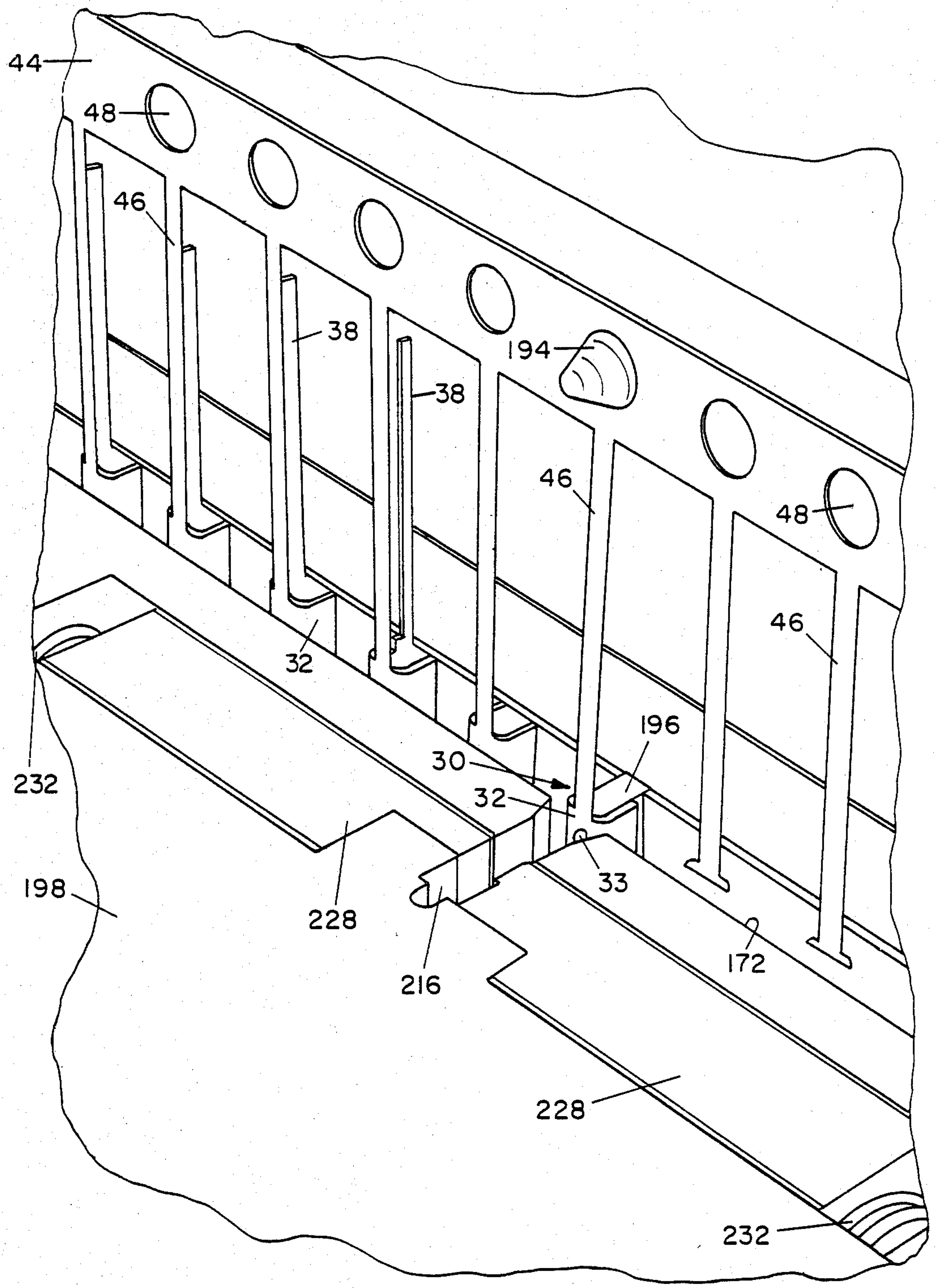
FIGS. 18 to 22 depict steps of the contact insertion operation.

A plan view of the lower plate 114 is shown in FIG. 13. A feeder slot 172 enters from one side 174 of the lower plate 114, passes by first and second ratchet wheels 175, having pins 176 on an upper portion thereof, and terminates at the other side 178. Each ratchet wheel 175 has an associated spring biased stop lever 182 and is indexed by a pin 184 which is activated by a shaft 185 which is moved laterally by a lever 186 (see FIG. 8) which is activated by the downward movement of the cam 115. In operation, a contact strip 42 (see FIG. 4) is placed in the feeder slot 172 and moved past the ratchet wheels 175 until the pins 176 fall into the openings 48 in the spine 44. The pins 184 are then indexed to the right, as seen in FIG. 13, under the control of the shaft 185 to index the ratchet wheels 175—175. The wheels 175—175, in turn, index the contact strip 42, to the left, to place the next contact 30 to be processed at a cut and transfer station 190 which is best seen in FIG. 14.

The cut and transfer station 190 shown in FIGS. 14 to 17, is comprised of a die member 192, a spring biased alignment pin 194, and a cut and transfer tool 196 (see FIG. 15) which is attached to the top surface of a base member 198. The die member 192 (see FIG. 17) is a metallic block of material which is fastened to the base member 198. The die member 192 has narrow slot 202 cut therein with a tapered opening section 204 and a cutting blade 206 located proximate the lower end of the narrow slot. The narrow slot 202 terminates in a substantially square opening 208 that extends from the top 210 to the bottom 212 of the die member 192 as can best be seen in FIG. 14.

The base member 198 (see FIGS. 15 and 16) has an elongated slot 216 extending from the top 218 to the bottom 222 surfaces thereof with a tapered opening 224 in the sidewall 226 thereof. A pair of clamping members 228—228 are laterally disposed to the slot 216 and biased inwardly by springs 232—232. Each of the members 228—228 have a lip 234 extending from one end thereof into the slot 216. An arm 242 having a bifurcated end is biased by a spring 243 and is slideably mounted for movement towards and away from the elongated slot 216 within the base member 198. The movement of the arm 242 is controlled by a lever 244 which is activated by a cam 246 coming in contact with a bearing 247.

In operation as shown in FIGS. 14 to 17, the strip of terminals 42 (not shown) is indexed along the feeder slot 172 as hereinbefore described. After each incremental indexing of the strip 42 the alignment pin 194 is urged forward by the cam 115 (see FIG. 15). The pin 194 enters an opening 48 in the spine 44 of the strip to accurately align the next contact 30 depending therefrom with the slots 202 and 216 in the die member 192 and the base 198, respectively. Also, at this time the bifurcated arm 242 (see FIG. 16) is urged toward the contact 30, to position it in front of the transfer tool 196 prior to cutting the contact from the strip 42.

Figure 19:
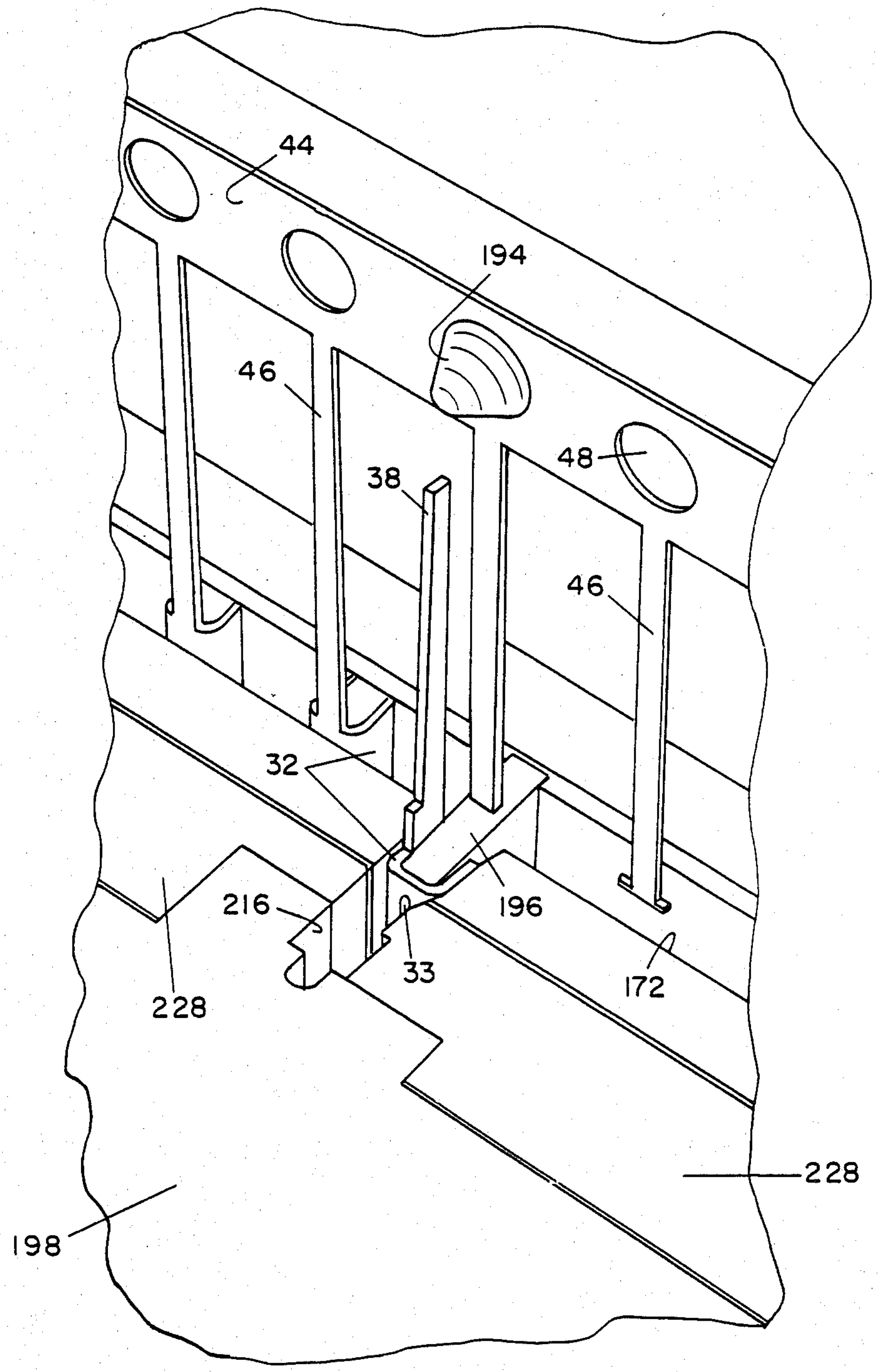
Figure 20:
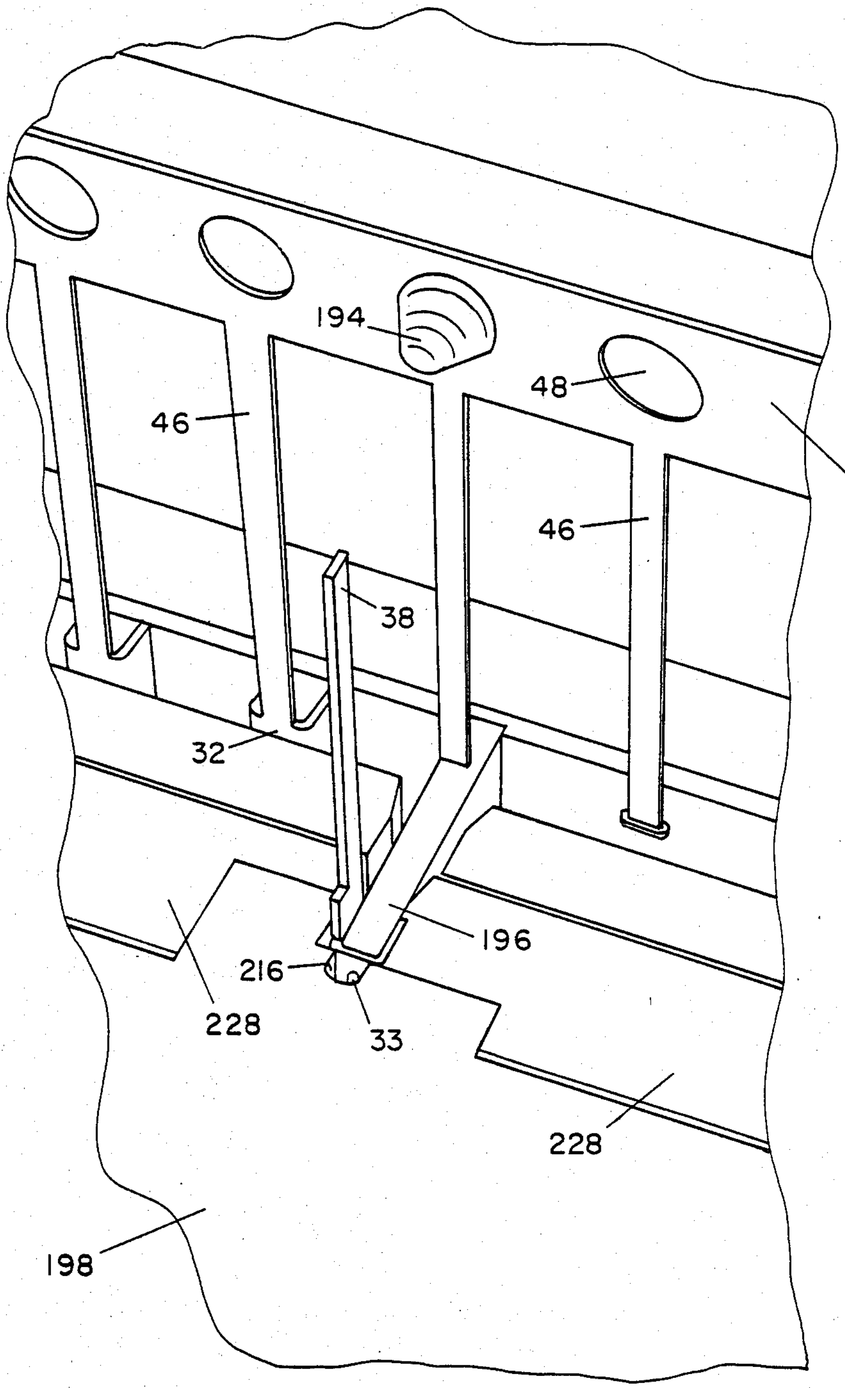
Figure 21:
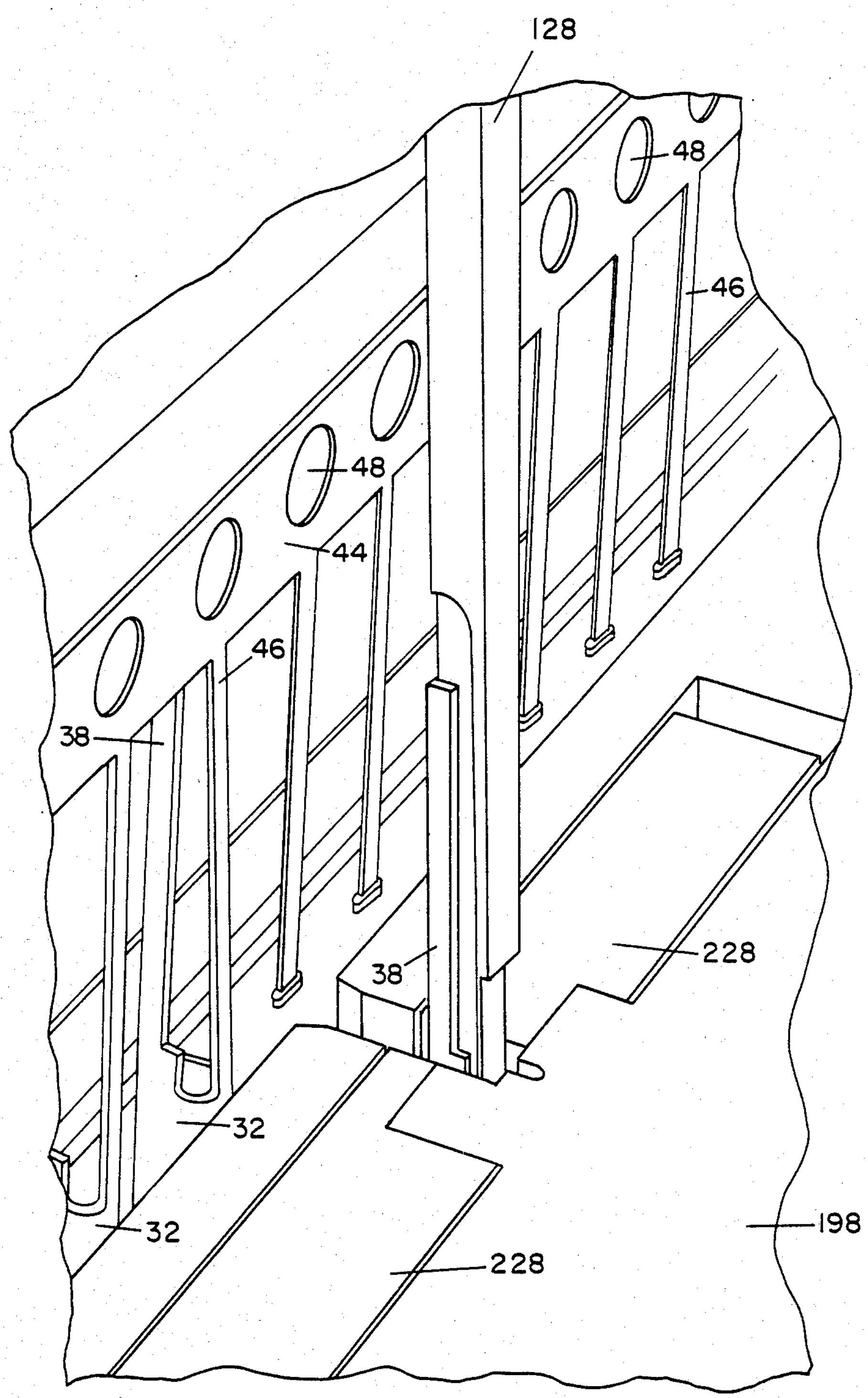

FIGS. 18 to 22 depict the cutting, transferring and inserting operations. For purposes of clarity the die member 192 has been removed in those figures. The cut and transfer tool 196 (see FIGS. 15 and 18) is urged into contact with a contact 30 at the interface of the body portions 32 and the support member 38. The cut and transfer tool 196 is then further urged past the cutting blade 206 (see FIG. 17) on the die member 192 which severs the support member 46 from the body portion 32 of the contact 30 as shown in FIG. 19. The cut and transfer tool 196 continues to urge the body portion 32 of the contact 30 past the clamping members 228—228 and into the elongated slot 216 (see FIG. 20). Clamping members 228—228 slideably capture the contact 30 when it has reached the end of slot 216.

Figure 22:
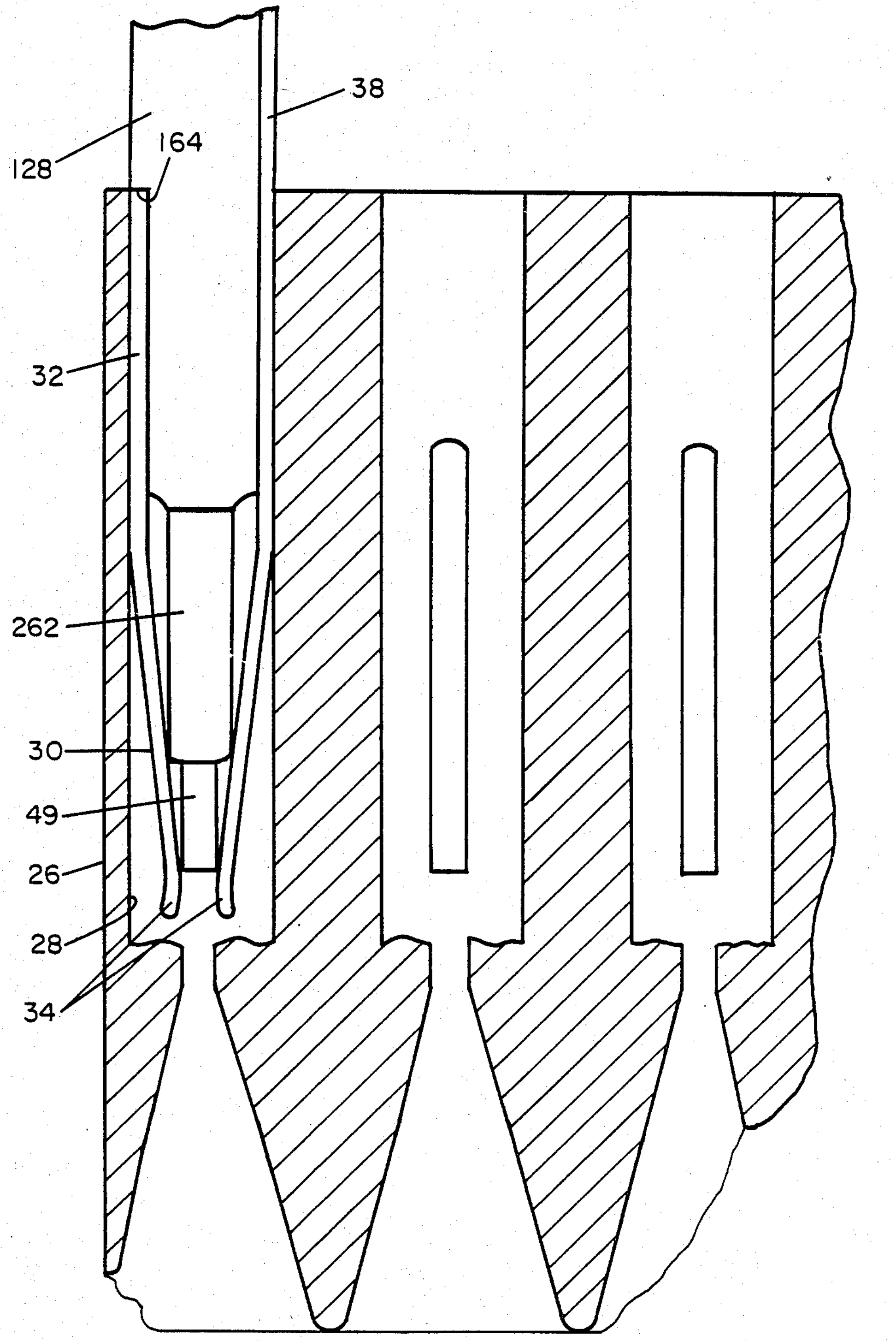

The punch 128 is then urged downward (see FIGS. 21 and 22) to insert the end 262 thereof into the contact 30 to spread the tines 34—34 thereof slightly apart. Continued downward movement of the punch 128 causes a ridge 164 thereon to touch one side of the contact body 32 as the tines 34—34 are moved further apart. Continued downward movement of the punch 128 overcomes the frictional forces of the clamping members 228—228 causing the contact 30 to exit the bottom of the lower plate and be inserted into a cavity 28 in a connector housing 26 as shown in FIG. 22. The opened duck-bill tines 34—34 straddle the opposed ribs 49—49 within the cavity 28. The punch 128 is then withdrawn leaving the contact with the tines 34—34 held apart by the ribs 49—49 with the tail 38 projecting upwardly from the connector housing 26. The connector housings 26—26 are repetitively indexed and the insertion steps are repeated as contacts 30—30 are inserted into cavities 28—28 by multiple heads 80—80 as is fully described in the above-referred to application.

It is to be understood that the embodiments described herein are merely illustrative of the principles of the invention. Various modifications may be made thereto by persons skilled in the art which may embody the principles of the invention and fall within the spirit and scope thereof.

What is claimed is:

1. A method of inserting an electrical contact, having a body portion and a pair of opposed tines depending therefrom, into a connector cavity having opposed ribs therein, the method comprising the steps of:

(a) aligning the contact with the connector cavity;

(b) inserting a punch into the body portion of the contact to spread the tines apart; and (c) urging the contact into the cavity to cause the previously spread tines to straddle the opposed ribs.

2. The method as set forth in claim 1, characterized by:

repeating steps (a) and (c) for a predetermined array of cavities in the connector.

3. A method of inserting electrical contacts, each having a body portion and a pair of opposed tines depending therefrom, into a connector cavity having opposed ribs therein, the method comprising:

(a) indexing a strip of contacts depending from a spine, past a cutting station;

(b) cutting a contact from the spine;

(c) transferring the contact to a position in axial alignment with the connector cavity;

(d) inserting a punch into the body portion of the contact to spread the tines apart; and (e) urging the contact into the cavity to cause the previously spread tines to straddle the opposed ribs.

4. The method as set forth in claim 3, characterized by:

repeating steps (a) through (e) for a predetermined array of cavities in the connector.

5. An apparatus for inserting electrical contacts, each having a body portion and a pair of opposed tines depending therefrom, into a cavity in a connector housing, said cavity having opposed ribs therein, the apparatus comprising:

a support means;

a punch mounted on said support means;

means, mounted on said support means, for axially positioning a contact between and in axial alignment with the punch and the cavity of a connector; and means, mounted on said support means, proximate said punch, for urging the punch through the body portion of the contact to spread the tines apart, and to further urge the contact into the cavity to position the contact therein with the tines straddling the ribs.

6. Apparatus for inserting electrical contacts, having a body portion and a pair of opposed tines depending therefrom, into a cavity in a connector housing, said cavity having opposed ribs therein, the apparatus comprising:

a support means;

a punch mounted on said support means;

means, mounted on said support means, for indexing a plurality of the contacts, depending from a spine, past a cutting station;

means, operatively associated with the indexing means, for cutting a contact from the spine, and transferring said contact to a position between and in axial alignment with the cavity of a connector and the punch; and means, positioned on the support means, for urging the punch into the body portion of the contact to spread the tines apart, and to further urge the contact into the cavity to position the contact therein with the tines straddling the ribs.

* * * * *